(12) United States Patent
Regner

(10) Patent No.: US 12,220,053 B2
(45) Date of Patent: Feb. 11, 2025

(54) FURNITURE MADE FROM PANELS

(71) Applicant: Sam John Regner, Reyersdorf (AT)

(72) Inventor: Sam John Regner, Reyersdorf (AT)

(*) Notice: Subject to any disclaimer, the term of this patent is extended or adjusted under 35 U.S.C. 154(b) by 0 days.

(21) Appl. No.: 17/768,248

(22) PCT Filed: Oct. 22, 2020

(86) PCT No.: PCT/AT2020/060376
§ 371 (c)(1),
(2) Date: Apr. 23, 2022

(87) PCT Pub. No.: WO2021/077146
PCT Pub. Date: Apr. 29, 2021

(65) Prior Publication Data
US 2024/0292947 A1    Sep. 5, 2024

(30) Foreign Application Priority Data

Oct. 22, 2019   (AT) .............................. A 50909/2019

(51) Int. Cl.
*A47B 47/04* (2006.01)
*A63H 33/00* (2006.01)
*F16B 12/12* (2006.01)

(52) U.S. Cl.
CPC ......... *A47B 47/042* (2013.01); *A63H 33/008* (2013.01); *F16B 12/125* (2013.01); *A47B 2230/0096* (2013.01)

(58) Field of Classification Search
CPC .............. A47B 47/042; A47B 47/0075; A47B 2230/0081; A47B 2230/0096;
(Continued)

(56) References Cited

U.S. PATENT DOCUMENTS 2,366,676 A * 1/1945 Rosenthal ............ A47B 47/042
  108/180
3,313,575 A    4/1967 Clapp
(Continued)

FOREIGN PATENT DOCUMENTS

| CN | 104819192 A | 8/2015 |
| FR | 2176194 A | 10/1973 |
| GB | 660567 A | 11/1951 |

*Primary Examiner* — Hiwot E Tefera
(74) *Attorney, Agent, or Firm* — Andrew Wilford

(57) ABSTRACT

The invention relates to a piece of furniture made from a plurality of interconnectable planar elements (1, 2), in particular designed as a piece of children's furniture, such as a play house, wherein at least two of the adjacent planar elements (1, 2) are connectable by at least one plug connection, and wherein said plug connection is formed by a protrusion (3) which is formed on the end face of a first planar element (1) and which has an opening (4) extending crosswise to the flat side of the planar element (1), a recess (5) in a second planar element (2) into which the protrusion (3) of the first planar element (1) is insertable, and a securing element (6) which is interlockingly insertable into the opening (4) of the protrusion (3). The second planar element (2) has, in the region of the recess (5), a blind hole-shaped receptacle (8) protruding through the recess (5) from the nearest end face (7) of the planar element (2), which receptacle aligns with the opening (4) in the protrusion (3) of the first planar element (1) when in the assembled state. The securing element (6) is located completely within the blind hole-shaped receptacle (8) and in the opening (4) of the protrusion (3) when in the assembled state.

7 Claims, 3 Drawing Sheets

(58) Field of Classification Search
CPC .... A47B 2230/0077; A47B 2230/0085; A47B 2230/0092; A47B 47/0066; A47B 95/008; A47B 47/047; F16B 12/24; F16B 12/125; F16B 12/46; F16B 2012/466; A63H 33/084; A63H 33/044
See application file for complete search history.

(56) References Cited

U.S. PATENT DOCUMENTS

| | | | |
|---|---|---|---|
| 4,153,311 A | | 5/1979 | Takahashi |
| 5,279,232 A | * | 1/1994 | Gollick .................. F16B 12/24 108/193 |
| 6,045,290 A | | 4/2000 | Nocievski |
| 6,085,668 A | * | 7/2000 | Kanki .................. F16B 12/125 108/65 |
| 2006/0228172 A1 | * | 10/2006 | Gillia .................. A47B 13/003 403/355 |
| 2007/0261209 A1 | | 11/2007 | Sanders |
| 2011/0286792 A1 | * | 11/2011 | Henriott .................. F16B 12/46 403/375 |
| 2012/0045278 A1 | * | 2/2012 | Schooley .............. F16B 12/125 403/381 |
| 2012/0132774 A1 | * | 5/2012 | Crampton ............. F16B 12/125 248/316.1 |
| 2013/0048632 A1 | | 2/2013 | Chen |
| 2013/0256253 A1 | * | 10/2013 | Stuby .................... A47B 47/00 211/186 |
| 2015/0335151 A1 | * | 11/2015 | Fünfgeld ................ A47B 47/00 403/205 |
| 2016/0136535 A1 | * | 5/2016 | Heston ................. A63H 33/044 446/108 |
| 2017/0227035 A1 | * | 8/2017 | Fridlund ............. A47B 96/201 |
| 2019/0191870 A1 | * | 6/2019 | Derelöv ................ F16B 12/24 |

* cited by examiner

FURNITURE MADE FROM PANELS

CROSS REFERENCE TO RELATED APPLICATIONS

This application is the US-national stage of PCT application PCT/AT2020/060376 filed 22 Oct. 2020 and claiming the priority of Austrian patent application A50909/2019 itself filed 22 Oct. 2019.

FIELD OF THE INVENTION

The invention relates to furniture made of a plurality of interconnectable planar elements, in particular designed as children's furniture such as a playhouse.

In such a piece of furniture at least two of the adjacent planar elements can be connected by at least one plug connection, that is formed by a projection formed on the edge of a first planar element and having an opening extending crosswise to the flat side of the planar element. A recess in a second planar element receives the projection of the first planar element, and a securing element is interlockingly insertable into the opening on the projection.

STATE OF THE ART

Furniture with different plug connections that can be assembled quickly and without tools and, if necessary, disassembled again, has been known for a long time. For example, U.S. Pat. No. 2,366,676 or U.S. Pat. No. 4,153,311 describe shelving systems made from boards that can be plugged together and are fixed at critical points by a securing element that can be inserted into a tab. In particular, US 2016/136535 discloses a playhouse for children that can also be quickly assembled simply by plugging it together and that is finally fixed in the assembled state by a bolt as a securing element that is inserted into corresponding openings.

The known connections have the disadvantage that, particularly in the case of furniture for children, such as playhouses, this type of assembly can indeed be carried out quickly and easily, but the securing elements can also be easily removed by the children. This creates a considerable risk of injury to the child, as it is possible that he or she will be trapped between unsecured construction elements or even for the entire construction to collapse and for components to fall onto the child. Since construction by plug connections with more valuable wooden construction elements has not been practicable up to now due to the above-mentioned safety concerns, either lighter elements, such as cardboard or foam materials, are used, or expensive firmly screwed furniture is used.

OBJECT OF THE INVENTION

The aim of the present invention is to create a modular piece of furniture, in particular designed as a piece of children's furniture, such as a playhouse that can be assembled particularly quickly in a few minutes and without the use of tools. At the same time, it should allow be able to be quickly dismantled and stowed away to save space. The playhouse should be built from high-quality wooden components and still be cheaper and more convenient to use than playhouses that are firmly screwed together. The replacement of individual components with differently designed modules offering different play options should be possible just as quickly so that the piece of furniture can be adapted to children of different ages and different interests. Additional functional elements, such as an illuminated starry sky, should be able to be installed just as quickly. The securing-together of the structure should be protected after assembly from tampering by children to avoid any risk of injury.

SUMMARY OF THE INVENTION

This object is achieved by the present invention in that the second planar element in the region of the recess has a blind hole extending through the recess from the nearest edge of the planar element, which hole, in the assembled state, is aligned with the opening in the projection of the first planar element, and wherein the securing element in the assembled state lies completely within the blind hole and in the opening of the projection. Due to the fact that the securing element is located completely within the second planar element when assembled, it can no longer be easily removed from the outside, which is why unintentional disassembly, for example by a child, is prevented. The securing element may e.g. be a small wooden plate, and the blind hole may be a slot into which it is inserted. The small wooden plate can be artistically designed, for example as a friendly gnome, which also makes it clear to the child that this gnome is the most important protective element holding the entire playhouse or piece of furniture together.

It is a further advantageous feature that, in the assembled state, the securing element is clamped in a friction-locked manner in the blind hole in the second planar element. A form-fitting connection is indeed already sufficient for securing, but an additional force-fitting connection by clamping the securing element also prevents it from falling out involuntarily if, for example, the piece of furniture should be tilted completely or bumped violently.

According to a further advantageous feature, it is provided that in the region of the blind hole in the second planar element, an opening is provided on the flat side of the element, which opening extends into the blind hole and, when assembled, is approximately aligned with an opening in the securing element so that the securing element can be released from the fixed position by inserting a tool, such as a pin, into the openings and by subsequently performing a pushing movement. A tool, such as a pin, can be inserted through this opening for intentional disassembly to push out the securing element. For this to be possible, the outer edge of the opening in the securing element, seen from the direction of insertion, must project further inward in the direction of insertion than the outer edge of the opening in the second planar element. This can either be achieved by making the opening in the securing element smaller overall than that in the second planar element, or by placing it further inward in the direction of insertion so that the two openings are only approximately aligned and the corresponding edge in the opening in the securing element provides an engagement surface for the tool to be inserted. As a result of the short movement with the tool against the direction of insertion, a section of the securing element then projects from the edge of the second planar element and can be gripped from the outside and removed again.

It is also a further advantageous feature that the blind hole in the second planar element and the securing element have a key-lock-geometry that is coordinated with one another so that the securing element can only be fully inserted in one direction of insertion. Apart from the artistic design of the securing element, said element can also have a special geometry, such as an essentially triangular or wedge-shaped form, or also have lateral grooves or indentations. If the blind hole is of the inverted design, it can be ensured in this way that the securing element can only be inserted correctly in a specific direction. This excludes any misuse during assembly.

In one possible embodiment of the invention, it is provided that the piece of furniture is a playhouse that comprises four planar elements as wall parts and one planar element as a roof part, the wall parts being able to be plugged into one another via hooks and holes and the roof part allowing to be connected to at least two opposing wall parts each via at least one plug connection with a covertly insertable securing element. The wall parts of the playhouse can be assembled very quickly simply by inserting the respective hooks into the holes of the adjacent wall part. With different wall parts having the same arrangements of hooks and holes, a wide variety of modules with different openings and play elements can be combined as desired. Finally, a roof part is put on from above to secure the entire construction by inserting the securing elements. In the most minimal case, you only need appropriate securing elements on two opposite wall parts for connection to the roof part. For complete security, however, it is preferred to provide at least one securing element between each wall part and the roof part.

It is a further advantageous feature that, in the assembled state, inwardly extending projections are provided in the upper section on the wall parts for supporting an intermediate ceiling part, and that downwardly extending projections are provided on the roof part so that an inserted intermediate ceiling part is clamped between the projections of the wall parts and the projections of the roof part. This makes it particularly easy to equip the interior of the playhouse with different modules and functions. For example, an intermediate ceiling part can be inserted that has light elements in the form of a starry sky. All of the electronics and, for example, a battery box and/or a receiver for the remote control for switching the light elements on and off are located on top of the intermediate ceiling part and are thus secured between the roof part and the intermediate ceiling part. If a direct light switch is provided, it projects downward through a corresponding opening in the intermediate ceiling part and can therefore be operated by the child in the playhouse. As a result, the sensitive parts are inaccessible to children, with the overall construction still only requiring the plug connection with the securing element to connect all parts in a childproof manner. Depending on the application, other intermediate ceiling elements can also be inserted in a modular manner, for example with attachments for a swing, a hanging chair or the like. Other electronic devices such as a microphone, a loudspeaker or a camera can also be integrated into the intermediate ceiling element. This makes it possible to supervise the children playing, similar to a baby phone, or to transmit music to the playhouse via the loudspeaker.

Finally, according to a further advantageous embodiment, it is provided that the piece of furniture is a wall mount with first planar elements that can be fastened to it in a modular manner and are formed as a wall part, with the wall mount comprising at least two mounting elements that are aligned in a right angle to the wall and vertically parallel to one another, on whose the upper side a joint pivotally connects the second planar element formed as a roof part and a wall part that can be modularly fastened to it can be fastened to the mounting elements of the wall mount via hooks and holes, after which the roof part, having been pivoted into a secured position, can be connected to the wall part via at least one plug connection with a securing element that in the assembled state lies completely within the blind hole and in the opening of the projection. Such a wall mount allows various wall elements that e.g. can exhibit different activities and games, to be fastened with the wall mount quickly and in a child-proof manner and exchanged. The wall elements can, for example, be constructed in the same way as the wall elements of a playhouse described above so that the individual elements can be used in different ways. There is also the possibility of hanging several wall elements on a wall mount for storage, in which case the wall element hung last is then secured by the roof part and the plug connection. This allows a playhouse to be stowed away in a space-saving manner without the risk of the individual plate elements falling over. The articulated connection of the roof part represents a preferred variant. It goes without saying that the roof part can also be put on as a separate element for securing and secured by plug connections.

BRIEF DESCRIPTION OF THE DRAWINGS

The invention will now be described in greater detail using exemplary embodiments and with the aid of the accompanying figures. Therein.

WAY(S) FOR CARRYING OUT THE INVENTION

Figure 1:
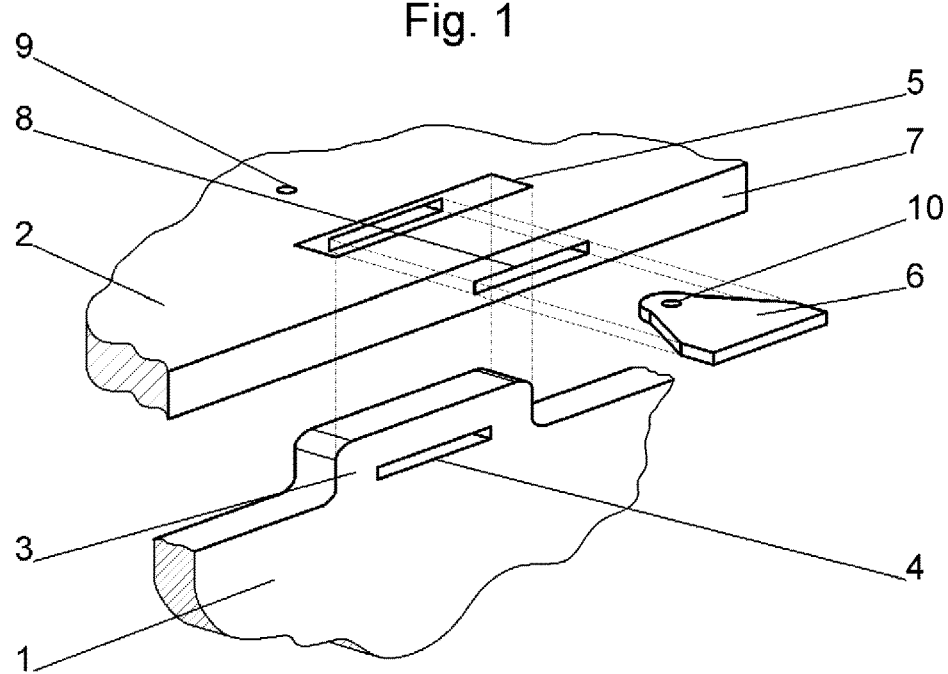
FIG. 1 is a schematic perspective exploded view of a plug connection of a piece of furniture according to the invention.

In the schematic exploded view shown in FIG. 1, only the section of a plug connection between a first planar element 1 and a second 2 planar element is shown. The dimensions do not correspond to the actual dimensions but merely illustrate the basic function of the plug connection. The first planar element 1, which forms a wall part here for example, has a projection 3 on its upper edge and formed with an opening 4 running crosswise to the flat side of the first planar element 1. The second planar element 2 is designed here as a roof part and has a recess 5 into which the projection 4 of the first planar element 1 can be inserted. The recess 5 is shown in this embodiment as a throughgoing opening, but it is also possible to form this recess 5 as a blind hole, for example if the roof part is made thicker.

The second planar element 2 further has, on the edge 7 closest to the recess 5, a hole 8 in the form of a blind hole that projects crosswise through the recess 5. After projection 3 of the first planar element 1 has been inserted, this hole 8 is aligned with the opening 4 on projection 3. To secure the connection of the two planar elements 1 and 2, a securing element 6 is inserted that is accommodated completely within hole 8 and also projects through the opening 4 so that the two planar elements 1, 2 are connected in a form-fitting manner.

Figure 2:
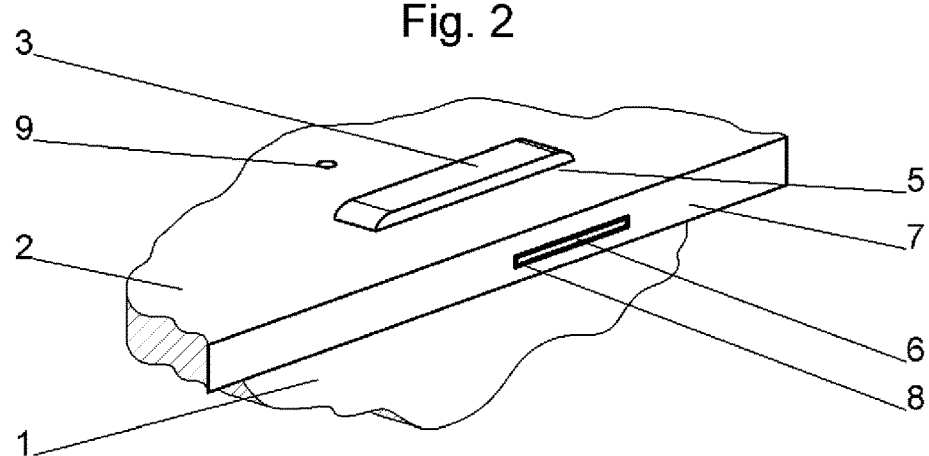
FIG. 2 shows the plug connection from FIG. 1 in an assembled perspective view.

In this embodiment, the securing element 6 is designed as a small plate and can be designed artistically. Ideally, securing element 6 and hole 8 are designed in such a way that a clamping effect occurs within the hole 8 when securing element 6 is inserted. In FIG. 2 the connection is shown in the assembled state. In this way, the securing element can no longer be removed without tools, which means that the connection is secured against unwanted manipulation, for example by children.

Figure 3:
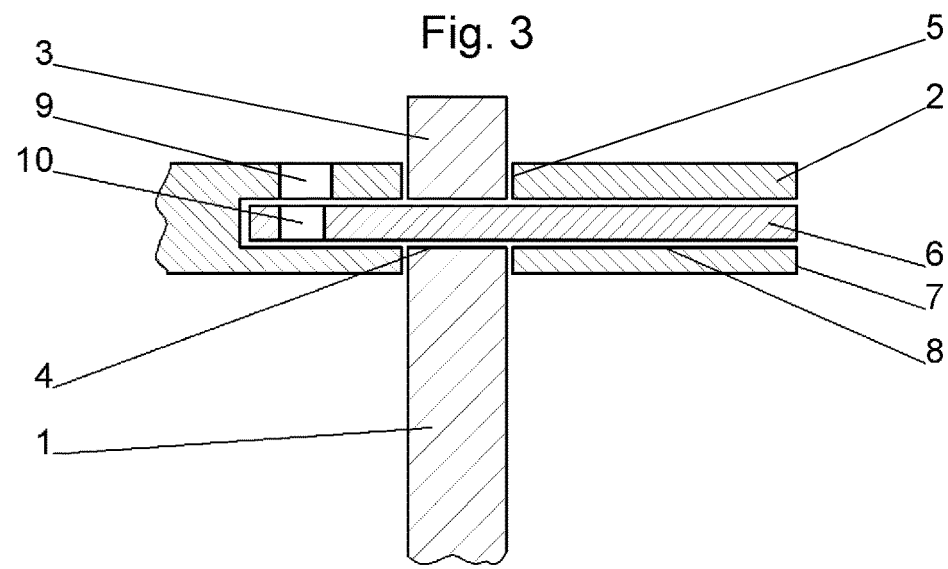
FIG. 3 is a schematic sectional view of the plug connection from FIGS. 1 and 2 in the assembled state.

In FIG. 3, the plug connection is shown in the assembled state in a sectional view. To enable securing element 6 to be removed from this position again, openings 9, 10 are provided both in securing element 6 and in the second planar element, which openings are almost aligned in the assembled state. In order to disassemble the piece of furniture, a tool, for example in the form of a pin, can be inserted into the opening 9 in the second planar element 2, which tool then also dips into the opening 10 in the securing element 6. By performing a lateral pushing movement, securing element 6 can be pushed out a little from hole 8. The securing element 6 can then be gripped and removed again from the edge 7 of the second planar element 2. This also ensures rapid disassembly for dismantling and reassembling the piece of furniture.

Figure 4:
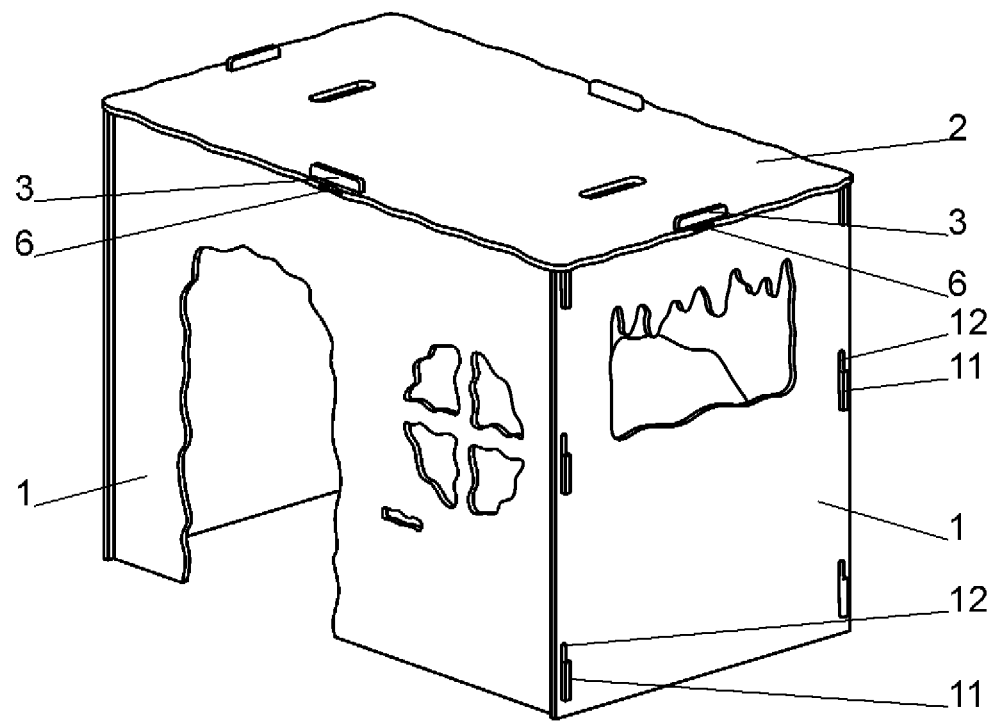
FIG. 4 is a schematic perspective view of a playhouse according to the invention.

In FIG. 4, a piece of furniture according to the invention is shown as a playhouse for children. The playhouse has four first planar elements 1 that form the wall parts. On the side edges, the wall parts each have three designed hooks 11 that can be inserted into corresponding holes 12 on the side edges of the adjacent wall parts. The walls of the playhouse can be erected quickly by simply plugging them together. For completion, a second planar element 2 is put on as a roof part. A plug connection as described above is between each wall part and the roof part and the roof part is secured by inserting four securing elements 6. As a result, the wall parts can no longer be pulled apart from one another and the entire playhouse is connected in a childproof manner.

The playhouse is intended to stimulate children's creativity and at the same time offer various learning stimuli, which is achieved through the use of various modular wall parts that can be very easily exchanged by choice. For example, the individual wall parts can be equipped with doors, windows, handles, motor skill or play elements. Accessories can be attached to the individual modules or used together with them. For example, a Punch and Judy show, a feely bag, a learning clock, a basketball hoop, a steering wheel, a mirror, various throwing games, various locks and much more can be integrated into the wall parts or can be connected to them. Through different openings in different wall parts, such as doors, windows, decoratively designed handle holes and the like, it is also possible to supervise the child playing in the house. Due to the rapid rearrangement, it is thus possible to use different modules in a targeted manner, which also offers the child variety without overwhelming it with an oversupply.

Figure 5:
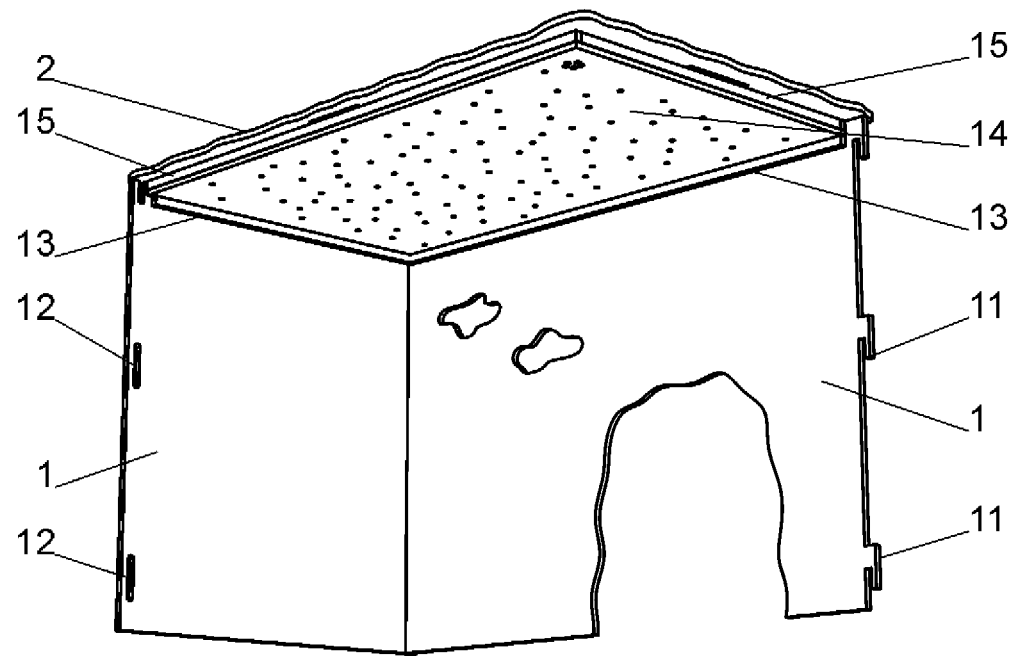
FIG. 5 is another schematic perspective view of a playhouse according to the invention with an intermediate ceiling part inserted.

The playhouse should also offer a protected, cave-like space for the child to retreat to. In FIG. 5 a playhouse is shown schematically, in which two of the wall parts are not depicted. In the upper area of the wall parts, there are inwardly extending projections 13 in the form of bars that carry an intermediate ceiling part 14. In the shown intermediate ceiling part 14, LED lights are incorporated in drilled holes to illuminate the interior of the playhouse as a starry sky. The electronics and a battery box and/or a receiver for a remote control are located on top of the intermediate ceiling part 14 and are therefore inaccessible to the child, which also rules out unwanted manipulation of the live parts here. A light switch can also project through a corresponding recess in the intermediate ceiling element so that the child can operate the light directly. projections 15 in the form of bars extending downward are provided on the roof part that, when the roof part is fitted, press the intermediate ceiling part 14 in the direction of the projections 13 that are located on the wall parts, and thus pinch it. The intermediate ceiling part is thus also secured against unintentional lifting by the child and injuries caused by clamping are avoided. Also in this case, other intermediate ceiling elements 14 with different designs can again be inserted in a simple, modular manner.

Figure 6:
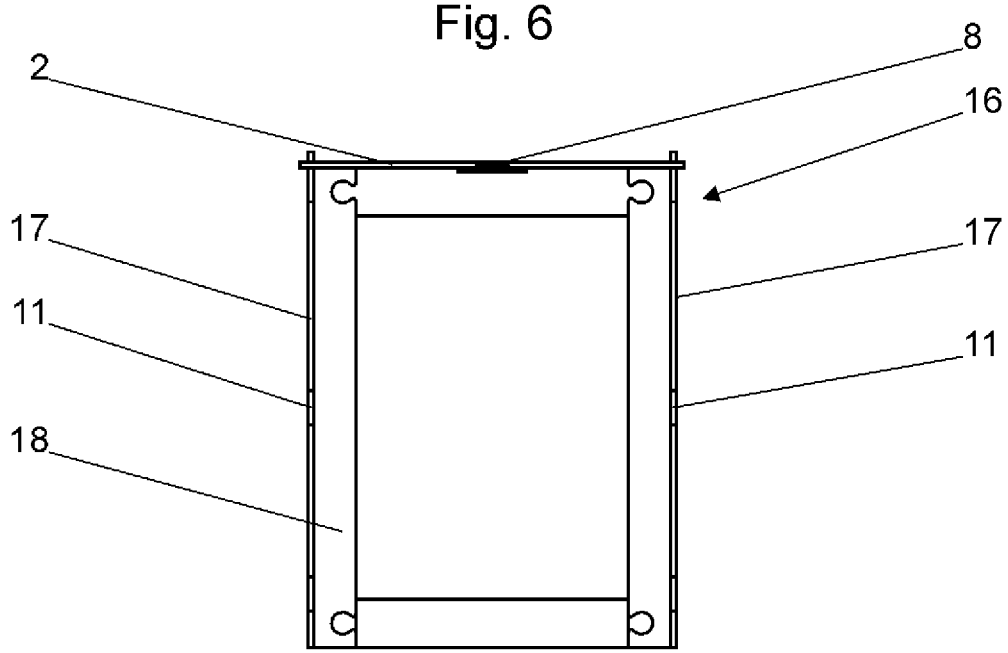
FIG. 6 schematically shows a wall mount.

A wall mount 16 is shown in FIG. 6. This is an embodiment of a piece of furniture according to the invention, in which different modular wall parts can be attached to the wall mount 16. Different activities and games can be on the individual wall parts. The wall mount 16 comprises two lateral mounting elements 17 extending vertically and at a right angle to the wall and a second planar element 2 above and crosswise thereto as a roof part. The roof part can either be fitted loosely or hinged to the mounting elements 17. In order to give the wall mount more stability and to enable simple assembly, the essential elements are connected to one another via frame elements 18.

Figure 7:
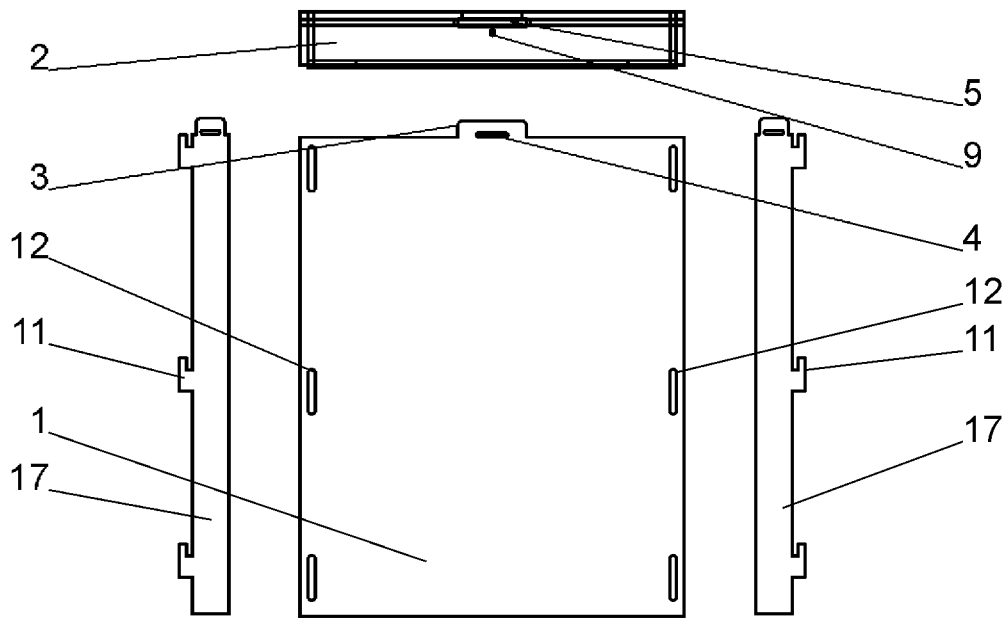
FIG. 7 shows the essential elements of the wall mount from FIG. 6, each individually in a side view and with a schematically illustrated wall part to be fastened thereto.

FIG. 7 shows the essential elements of the wall mount 16 and a first planar element 1 schematically, each in side views. The first planar element 1 formed as a wall part can be hung on the hooks 11 of the mounting elements 17 via holes 12. The second planar element 2 that is shaped as a roof part, is then placed on or pivoted into a securing position. projection 3 of the first planar element 1 thereby penetrates into the recess 5 in the roof part and can then be secured by inserting a securing element 6 into the blind hole 8.

In this way, individual wall elements with different playful or educational activities can be exchanged quickly and easily, thus always offering variety. At the same time, the securing is childproof, as is the case with the playhouse. Wall elements from the playhouse can also be fixed to the wall mount 16 as wall parts, resulting in further application possibilities. A wall mount 16 can also be designed in such a way that several wall parts of a playhouse can be hung up for storage, with the securing then taking place via the plug connection between the roof part and the outermost wall part. This also ensures space-saving and safe storage of a playhouse when it is not in use.

The invention claimed is:

1. A piece of furniture comprising:
    first and second adjacent planar elements;
    a tab projecting from an edge of the first planar element and having a throughgoing first aperture extending transversely to a flat face of the first planar element;
    a cutout in the second planar element into which the tab of the first planar element is insertable;
    a securing element interlockingly insertable into the first aperture on the tab;
    a blind hole forming with the tab, cutout, and securing element a plug connection and extending through the cutout from an edge of the second planar element, and, in an assembled state, aligned with the first aperture in the tab of the first planar element, the securing element in the assembled state extending completely through the first aperture and lying completely within the blind hole and in the first aperture of the tab; and
    a second aperture near the blind hole in the second planar element, on a flat face of the second planar element, extending into the blind hole and in the assembled state generally aligned with a third aperture in the securing element, the securing element being releasable from a fixed position by inserting a tool such as a pin into the second and third apertures and by subsequently performing a pushing movement.

2. The piece of furniture according to claim 1, wherein the securing element in the assembled state is frictionally clamped in the blind hole in the second planar element.

3. The piece of furniture claim 1, wherein the blind hole in the second planar element and the securing element have a matched key-lock-geometry, the securing element being only fully inserted in only one direction of insertion.

4. The piece of furniture according to claim 1, wherein the first and second panels form part of a playhouse that comprises four planar elements as wall parts and one planar element as roof part, the wall parts being collectively pluggable into one another via hooks and recesses and the roof part being connectable to at least two opposite wall parts via respective such plug connections with a securing element that, in the assembled state, is located completely within the blind hole and in the first aperture of the tab.

5. The piece of furniture according to claim 1, wherein the second and third apertures, in a fully inserted position of the tab, overlap but are offset relative to each other so that forcing a pin through them shifts the securing element out of the blind hole.

6. A piece of furniture comprising:
first and second adjacent planar elements;
a tab projecting from an edge of the first planar element and having a throughgoing first aperture extending transversely to a flat face of the first planar element;
a cutout in the second planar element into which the tab of the first planar element is insertable;
a securing element interlockingly insertable into the first aperture on the tab;
a blind hole forming with the tab, cutout, and securing element a plug connection and extending through the cutout from an edge of the second planar element, and in an assembled state aligned with the first aperture in the tab of the first planar element, the securing element in the assembled state extending completely through the first aperture and lying completely within the blind hole and in the first aperture of the tab, the first and second panels forming part of a playhouse having four such first planar elements as wall parts and one such second planar element as roof part, the wall parts being pluggable into one another via hooks and recesses and the roof part being connectable to at least two opposite wall parts via at respective such plug connections with a securing element that, in the assembled state, is located completely within the blind hole and in the first aperture of the tab, inwardly extending tabs in the assembled state supporting an intermediate ceiling part on the wall parts at upper edges thereof, downwardly extending tabs being provided on the roof part such that an inserted intermediate ceiling part is clamped between the tabs of the wall parts and the tabs of the roof part.

7. A piece of furniture comprising:
first and second adjacent planar elements;
a tab projecting from an edge of the first planar element and having a throughgoing first aperture extending transversely to a flat face of the first planar element;
a cutout in the second planar element into which the tab of the first planar element is insertable;
a securing element interlockingly insertable into the first aperture on the tab;
a blind hole forming with the tab, cutout, and securing element a plug connection and extending through the cutout from an edge of the second planar element, and, in an assembled state, aligned with the first aperture in the tab of the first planar element, the securing element in the assembled state extending completely through the first aperture and lying completely within the blind hole and in the first aperture of the tab, the piece of furniture a wall mount with the first planar element modularly fastenable thereto and shaped as a wall part, the wall mount having at least two mounting elements that are aligned in a right angle to the wall parts and vertically parallel to one another and on whose upper ends a second planar element that is a roof part is connected in a pivotable manner via a joint, the wall part being fastenable in a modular manner thereto and also fastenable to the mounting elements of the wall mount via hooks and recesses, and after the roof part is pivoted into a securing position, the roof part is connectable to the wall part via at least one plug connection with a securing element that, in the assembled state, lies completely within the blind hole and in the first aperture of tab.

\* \* \* \* \*